(No Model.)

J. H. WIEMERS.

SIGNALING DEVICE FOR AUTOMATIC MEASURING MACHINES.

No. 526,915.   Patented Oct. 2, 1894.

Witnesses:
D. W. Gardner.
Jos. Gross.

Inventor:
John H. Wiemers
By his Attorney
George William Miatt (No Model.)
J. H. WIEMERS.
SIGNALING DEVICE FOR AUTOMATIC MEASURING MACHINES.
No. 526,915.
Patented Oct. 2, 1894.
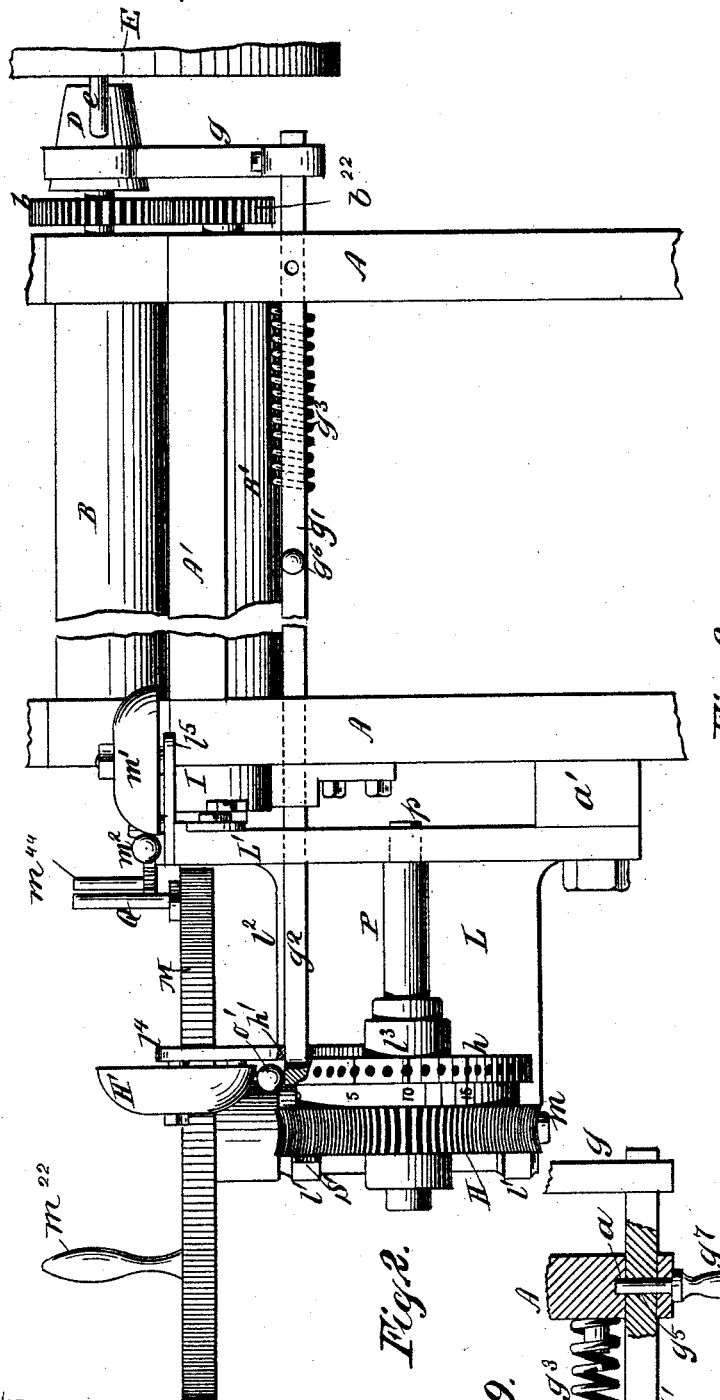
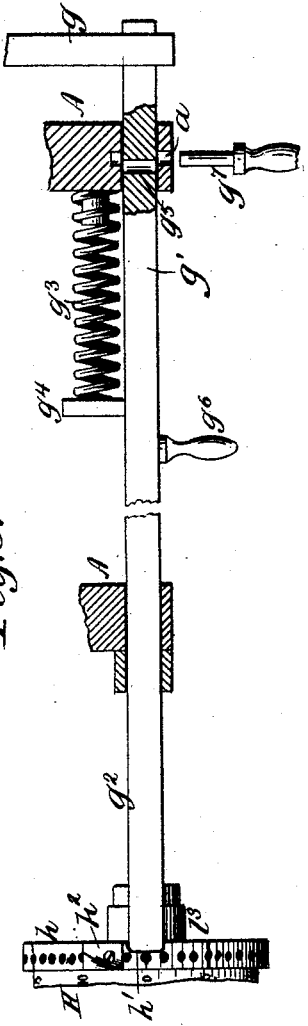
Witnesses:
D. W. Gardner
Jos. Gross
Inventor:
John H. Wiemers
By his Attorney
George William Miatt (No Model.) J. H. WIEMERS. 4 Sheets—Sheet 3.
SIGNALING DEVICE FOR AUTOMATIC MEASURING MACHINES.
No. 526,915. Patented Oct. 2, 1894.

Witnesses:
D. W. Gardner.
Jos. Gross.

Inventor:
John H. Wiemers
By his Attorney,
George William Miatt (No Model.) 4 Sheets—Sheet 4.
J. H. WIEMERS.
SIGNALING DEVICE FOR AUTOMATIC MEASURING MACHINES.
No. 526,915. Patented Oct. 2, 1894.
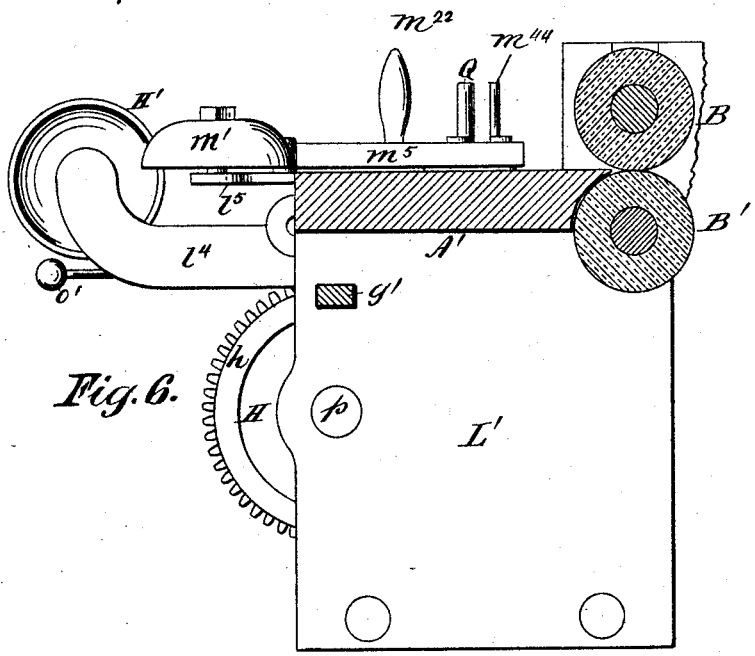
Fig. 6.
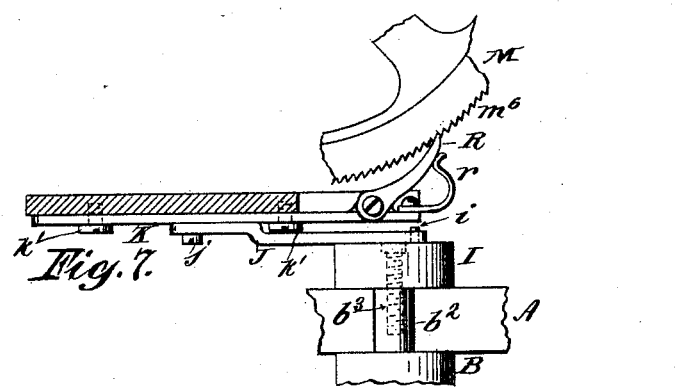
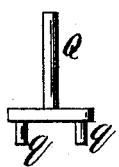
Fig. 10.
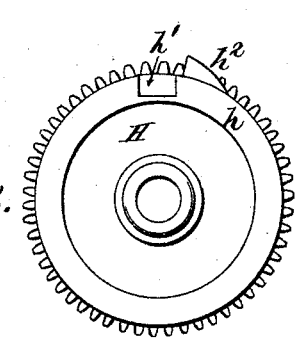
Fig. 7.
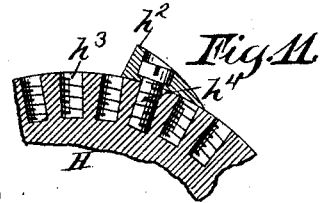
Fig. 8. Fig. 11.
Witnesses:
D. W. Gardner
Jos. Gross
Inventor:
John H. Wiemers
By his Attorney
George William Miatt

UNITED STATES PATENT OFFICE.

JOHN H. WIEMERS, OF NEW YORK, N. Y.

SIGNALING DEVICE FOR AUTOMATIC MEASURING-MACHINES.

SPECIFICATION forming part of Letters Patent No. 526,915, dated October 2, 1894.

Application filed March 14, 1894. Serial No. 503,564. (No model.)

*To all whom it may concern:*

Be it known that I, JOHN H. WIEMERS, a citizen of the United States, residing in the city, county and State of New York, have invented certain new and useful Improvements in Signaling Devices for Automatic Measuring-Machines, of which the following is a description sufficient to enable others skilled in the art to which the invention appertains to make and use the same.

My invention is designed to be utilized in the measurement of paper or any other material as it passes through or into a cutting machine, or other form of apparatus in which the material is to be manipulated in a prescribed manner, and where it is desirable that the operator be notified automatically when a certain quantity of material has been run off. My improvements are designed to accomplish this, and to adapt the apparatus to the indicating of long or short runs as may be required; and the invention consists in the special construction and arrangement of parts hereinafter described and claimed.

In the accompanying drawings I illustrate practical means for carrying out my invention, although I do not wish to confine myself strictly to the identical form and construction of parts shown, since it is obvious that modifications may be made therein without departing from the spirit and intent of the invention.

The drawings illustrate my apparatus as applied to a paper slitting machine, although it is applicable, as before stated, to various classes of machinery.

Figure 1:
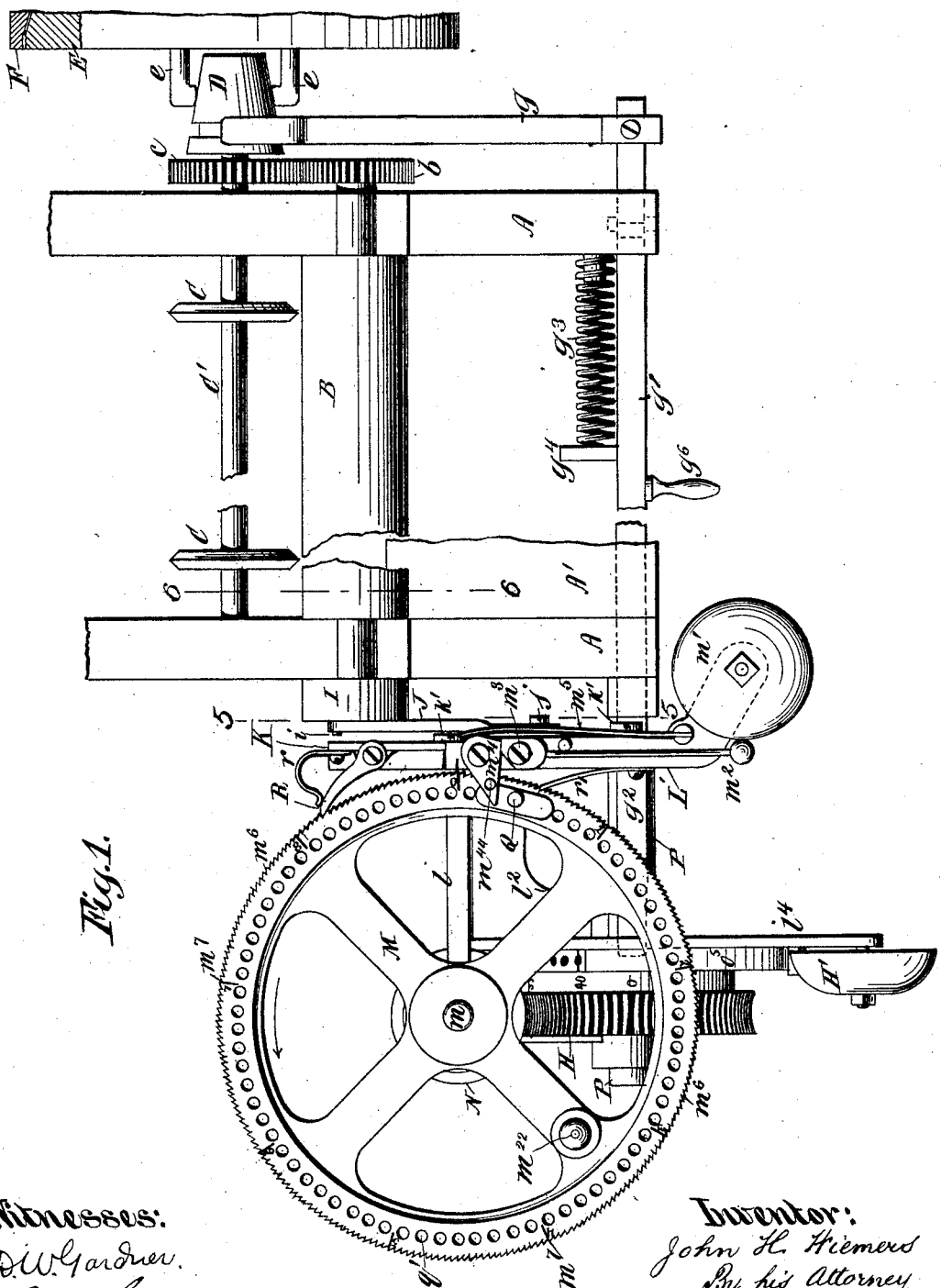
Figure 4:
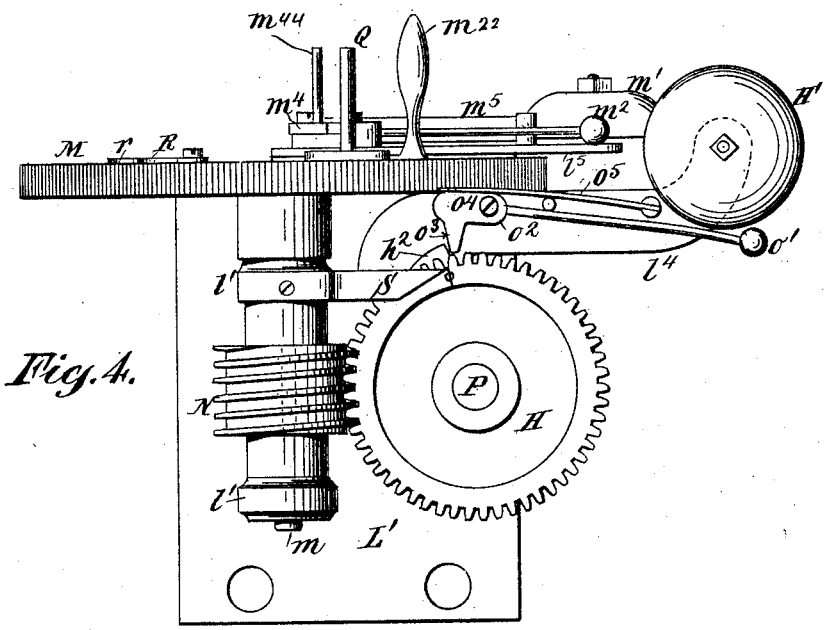
Figure 5:
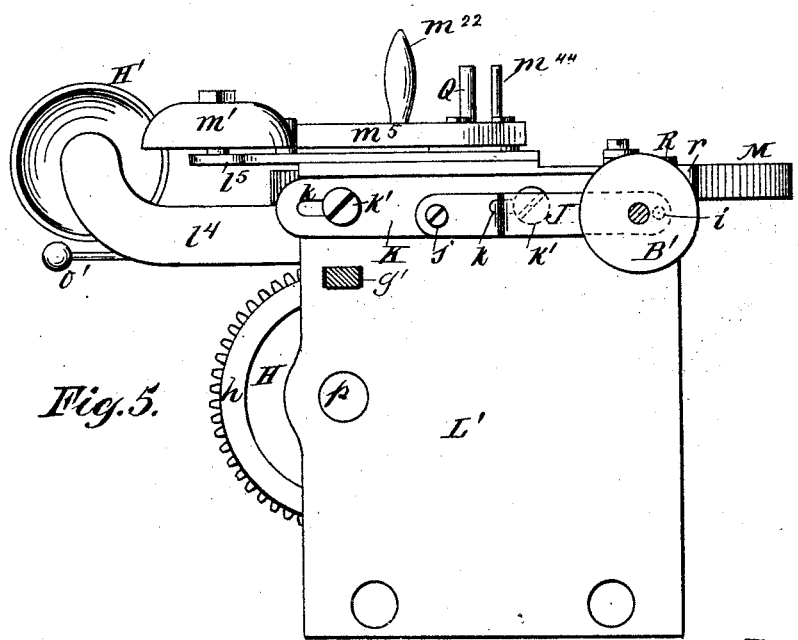

Figure 1, is a plan, showing portions of the paper slitting machine broken away; Fig. 2, a front elevation of the same. Fig. 3, is a detail view of the parts for controlling the clutch mechanism by which the machine is connected with the power pulley. Fig. 4 is a side elevation of my indicating mechanism; Fig. 5, an elevation of the same from the opposite side, being a section upon line 5, 5, Fig. 1. Fig. 6, is a similar view taken upon line 6, 6, Fig. 1; Fig. 7, a detail view of the mechanism by which the motion of the feed rollers is transmitted to the registering mechanism. Fig. 8, is an elevation of the inner side of the long-run registering wheel, showing the recess into which the end of the power clutch rod drops at the end of the run, to stop the machine. Fig. 9, is a detail showing means for holding the power clutch in engagement with the power pulley when a short run only is being made. Fig. 10, is a detail of the tripping stud, which is adjustable upon the ratchet wheel. Fig. 11, is a section view illustrating the means for securing and adjusting the trip upon the long run wheel.

A, represents the frame of the paper-slitting machine; B, and B′, the feed rollers mounted therein. The table A′, is situated so that its upper surface is utilized in feeding the material between the said rollers B, B′, as will be understood by reference to Fig. 6.

C, C, are the cutters, on shaft C′, which is connected by a spur gear $c$, with the upper roller B, through the medium of the spur wheel $b$, which latter meshes into the spur wheel $b^{22}$, attached to the lower feed roll B′. A cone-clutch D, is situated upon the shaft C′, beyond the gear $c$, and engages with the prongs $e$, projecting outwardly from the side of the friction disk E, which engages with the inner surface of the power pulley F, when the machine is to be set in motion. This clutch D is moved back and forth through the medium of the bifurcated arm $g$, attached to the slide bar $g'$. See Figs. 1 and 3. The opposite end $g^2$, of this slide rod $g'$, is pushed constantly against the inner side $h$ of the long-run gear H, by the spring $g^3$, interposed between the shoulder $g^4$, on the rod $g'$, and the frame A, of the machine. The inner surface $h$, holds the rod $g'$, forward against the action of the spring $g^3$, so that the cone D, is held in engagement with the prongs $e$, and the friction disk E, in engagement with the power wheel F, until the recess $h'$, in the side of the long-run wheel H, comes into coincidence with the said end $g^2$, of the rod $g'$, when the spring $g^3$, forces the end $g^2$, into said recess $h'$, thereby withdrawing the clutch D, and locking the indicating apparatus as a whole. When only a short run is to be made, that is, a run less than that in which it is necessary to employ the long-run wheel H and its bell H′ in announcing or determining the length of the run, the clutch D, is held in engagement with the disk E, by a pin $g^7$ inserted into the socket $a$, (Figs. 3 and 9) formed in the frame A, and through the hole $g^5$, in the rod $g'$,—the latter being pulled forward by means of the handle $g^6$, against the resistance of the spring $g^3$, until the hole $g^5$, is in coincidence with the socket $a$, and the pin $g^7$, is inserted.

A disk I, is attached to the journal $b^2$, of the upper feed roller B, by a screw $b^3$, and forms a continuation of the roller B', beyond the frame A. The outer end of this disk I, is formed with a crank pin $i$, which engages with the inner end of a pitman J, the opposite end of which is pivotally connected to the slide plate K, at $j$. The slide plate K, is formed with the slots $k$, through which the screws $k'$, pass, the heads of said screws holding the slide plate K, against the inner surface of the vertical member L', forming part of the bracket L. This bracket L, is attached to the frame A, at $a'$.

The vertical web $l$, of the bracket L, is formed with two horizontal bearings $l'$, $l'$, in which is mounted the shaft $m$, to the upper end of which the large ratchet wheel M, is secured. Intermediate between the bearings $l'$, $l'$, is situated the worm gear N, also securely attached to the shaft $m$. The horizontal web $l^2$, is formed with a bearing $l^3$, which supports the horizontal shaft P, the inner end of which $p$, is stepped in the upright L', of the bracket L. This shaft P, has secured to its outer end the long run worm gear H, which meshes into the worm N.

An arm $l^4$, projecting upward from the bracket L, has a bell H' mounted upon it, together with its hammer $o'$, pivotally connected at $o^2$. A spur $o^3$, projects downward from the extension $o^4$, of the hammer $o'$, and is held normally within the path of the trip $h^2$, upon the long run wheel H, by a spring $o^5$. An arm $l^5$, projecting from the top of the upright $L^5$ of the bracket L, supports another bell $m'$, the hammer for which $m^2$, is pivotally connected to the upright L', at $m^3$. The hammer $m^2$, is provided with a trip $m^4$, which projects into the path of the stud Q, when the latter is inserted in the rim of the wheel M. The trip $m^4$, and the lever $m^2$, are held in this normal position by the spring $m^5$.

The wheel M, is provided with a handle $m^{22}$, for convenience in setting the apparatus by hand; and the trip $m^4$ is likewise provided with a small pin or handle $m^{44}$, by which it may be conveniently held back out of the path of the pin Q.

The stud Q, is formed with prongs $q$, which fit into holes $q'$, formed around the rim of the ratchet wheel M, so that the stud Q, may be adjusted upon the rim at any point with relation to the point of engagement of the pawl R, with the ratchet teeth $m'$, formed peripherally in said rim of the wheel M.

The pawl R, is attached to the slide K, and is held in engagement with the ratchet teeth $m^6$, by a spring $r$. Another spring $r'$, secured to the upright L', also engages with the ratchet teeth to prevent retractile movement of the wheel M, during the retractile movement of the pawl R.

The ratchet wheel M, is formed with any prescribed number of teeth $m^6$, the rim being sub-divided by marks $m^7$, which represent equal portions of the whole. Thus for instance the wheel M, is supposed to have two hundred and twenty-five teeth which are shown to be marked off in divisions of twenty-five.

The throw of the crank pin $i$, is sufficient to move the ratchet wheel M, the distance of one ratchet tooth only, and thus the feed roller B', (as also the feed roller B) will make two hundred and twenty-five rotations to one of the ratchet wheel M. If a less number of rotations of the feed rollers is to be counted and announced, stud Q, is set back from the hammer-trip $m^4$, a distance equal to the number of rotations to be counted, the holes $q'$, allowing the stud Q, to be placed approximately with relation to the number of ratchet teeth to be forwarded before the said stud encounters the trip $m^4$, and thereby causing the hammer $m^2$, to ring the bell $m'$. Where a longer run is being made the stud Q, will ring the bell $m'$, at the completion of each rotation of the wheel M; or if a very long run is being made in which the long-run wheel H, is to be used in registering and announcing the number of rotations of the feed rollers, the stud Q, may be withdrawn entirely.

By reference to Fig. 4, it will be seen that a permanent pointer S, is affixed to the hub $l'$, and affords a means of indicating the long-run wheel H, at zero when desired.

The worm N, at each rotation of the ratchet wheel M, moves the long run wheel H, forward a distance equal to one of its teeth so that it will take as many rotations of the wheel M, as there are teeth in the wheel H, to effect one rotation of the latter.

The trip $h^2$, is adjustable upon the hub of the wheel H, which is formed with a series of screw holes $h^3$, into any of which the screw $h^4$, may be screwed to clamp the trip $h^2$, down against the periphery of the hub. Fig. 11, shows a sectional view illustrating this construction.

When it is desired to set the trip $h^2$, so that it will announce a run of less length than that which would be required to effect a complete rotation of the wheel H, said trip $h^2$, is set back along the rim and away from the point at which it trips the hammer $o'$ a distance equal to the run required. Otherwise in a very long run it simply announces each rotation of the wheel H.

When it is desired to stop a long run at the end of the count desired the end of the bar $g'$, is allowed to bear against the inner surface $h$ of the wheel H, so that when the recess $h'$ is reached the clutch D, will be withdrawn from the friction disk E, and the wheel H, itself will be locked by the entrance of the end $g^2$, of the bar $g'$, into said recess $h'$.

When a comparatively short run is desired which can be counted conveniently by one or more rotations of the ratchet wheel M; or when a very long run is required extending beyond one or more rotations of the wheel H, the clutch D, is held continuously in contact with the friction disk E, by a pin $g^7$, inserted through the holes $a$, and $g^5$, in the frame A, and the rod $g'$, respectively. Instead of the pin $g^7$, and the holes $a$, $g$, any equivalent means may be substituted for holding the clutch D, in contact with the friction disk E.

What I claim as my invention, and desire to secure by Letters Patent, is—

1. The combination with a feed roller, of means for actuating and forwarding the ratchet wheel M, a prescribed distance at each rotation of said feed roller, said ratchet wheel M, provided with a stud for tripping a bell hammer, said bell hammer and its bell, the worm gear H, having the trip $h^2$, and the hammer and bell actuated thereby, substantially in the manner and for the purpose set forth.

2. The combination, with a feed roller, of means for actuating and forwarding the ratchet wheel M, a prescribed distance at each rotation of the feed roller, said ratchet wheel M, a bell hammer and bell, and a stud adjustable upon the said ratchet wheel M, for the purpose of ringing said bell after a prescribed number of rotations of the feed roller, substantially in the manner and for the purpose described.

3. The combination with the long-distance wheel, H, and with the trip hammer and bell H', o', of the trip $h^2$, made adjustable upon the said wheel H, for the purpose and substantially in the manner set forth.

4. In combination with the wheel H, formed with the recess $h'$, the bar $g'$, spring $g^3$, arm $g$, and clutch mechanism D, $e$, E, arranged and operating substantially in the manner and for the purpose described.

5. The combination, with the feed roller B', slide and pawl for actuating the ratchet wheel M, said ratchet wheel M, worm wheel N, gear wheel H, arm $g'$, and clutch D, of means for holding the clutch D, continuously in engagement with the friction disk E, independent of the wheel H, substantially in the manner and for the purpose described.

JOHN H. WIEMERS.

Witnesses:
G. W. MIATT,
D. W. GARDNER.